United States Patent
Baumbusch et al.

(10) Patent No.: US 6,298,531 B1
(45) Date of Patent: Oct. 9, 2001

(54) HIGHLY FLEXIBLE MACHINE TOOL

(75) Inventors: Frank Baumbusch, Eberbach; Walter Bauer, Simmonheim, both of (DE)

(73) Assignee: Witzig & Frank GmbH, Offenburg (DE)

(*) Notice: Subject to any disclaimer, the term of this patent is extended or adjusted under 35 U.S.C. 154(b) by 0 days.

(21) Appl. No.: 09/446,028

(22) PCT Filed: Jun. 16, 1998

(86) PCT No.: PCT/DE98/01629

§ 371 Date: Dec. 16, 1998

§ 102(e) Date: Dec. 16, 1998

(87) PCT Pub. No.: WO98/57777

PCT Pub. Date: Dec. 23, 1998

(30) Foreign Application Priority Data

Jun. 17, 1997 (DE) ............................................. 197 25 630
Oct. 22, 1997 (DE) ............................................. 197 46 494

(51) Int. Cl.[7] ............................................. B23P 23/00
(52) U.S. Cl. ................... 29/40; 29/36; 29/39; 82/129
(58) Field of Search .................. 29/36, 39, 40, 29/27 C, 33 P; 409/219, 1; 82/129; 483/55

(56) References Cited

U.S. PATENT DOCUMENTS

| | | | |
|---|---|---|---|
| 4,404,727 | * | 9/1983 | Zankl ................................. 483/18 X |
| 4,597,144 | * | 7/1986 | Frank et al. ............................ 29/40 |
| 4,597,155 | * | 7/1986 | Garrett et al. ........................... 29/36 |
| 4,944,339 | * | 7/1990 | Luyten ............................. 29/33 P X |
| 4,984,351 | * | 1/1991 | Matsuyama ...................... 409/158 X |
| 5,210,917 | * | 5/1993 | Piguet et al. ............................ 29/36 |
| 5,343,604 | * | 9/1994 | Takagi ............................... 29/27 C |
| 5,452,502 | | 9/1995 | Walter et al. ......................... 29/38 B |
| 5,669,867 | * | 9/1997 | Hoppe .................................. 483/55 |

FOREIGN PATENT DOCUMENTS

| | | |
|---|---|---|
| 302768 | 1/1967 | (AT) . |
| 36 26 324 A | 2/1988 | (DE) . |
| 88 14 245 U | 2/1989 | (DE) . |
| 90 14 605 U | 2/1991 | (DE) . |
| 43 01 393 A | 7/1994 | (DE) . |
| 44 30 113 A | 2/1996 | (DE) . |
| 0 45 27 35 | 2/1960 | (EP) . |
| 0 46 72 53 | 1/1992 | (EP) . |
| 0 71 26 82 | 5/1996 | (EP) . |
| 2 056 350 | 3/1981 | (GB) . |
| 2 183 697 | 5/1995 | (GB) . |

* cited by examiner

Primary Examiner—William Briggs
(74) Attorney, Agent, or Firm—Frishauf, Holtz, Goodman, Langer & Chick, P.C.

(57) ABSTRACT

A machine tool (1) has at least one but preferably two machining units (13, 14), which are assigned to two workpiece receptacles (8, 9). The machining units (13, 14) are adjustable in three axes (X, Y, Z), and they can each reach both workpiece receptacles (8, 9). The machining units (13, 14) are oriented such that their work spindles (11, 12) are in a preferably right space angle to one another. As a result, they can be moved past one another without colliding. Moreover, they can also work on the same workpiece at the same time. The workpiece receptacles are positionable independently of one another about a preferably but not necessarily common pivot axis (S). The workpieces are also rotatable about an axis (V) perpendicular to the pivot axis. This arrangement enables flexible machining of the workpieces from arbitrary directions in space. Because each machining unit (13, 14) in principle can machine every side of the workpiece of every workpiece receptacle (8, 9), both machining units (13, 14 can be utilized evenly. This minimizes idle times and time losses.

28 Claims, 12 Drawing Sheets

HIGHLY FLEXIBLE MACHINE TOOL

FILED OF THE INVENTION

Figure 1:
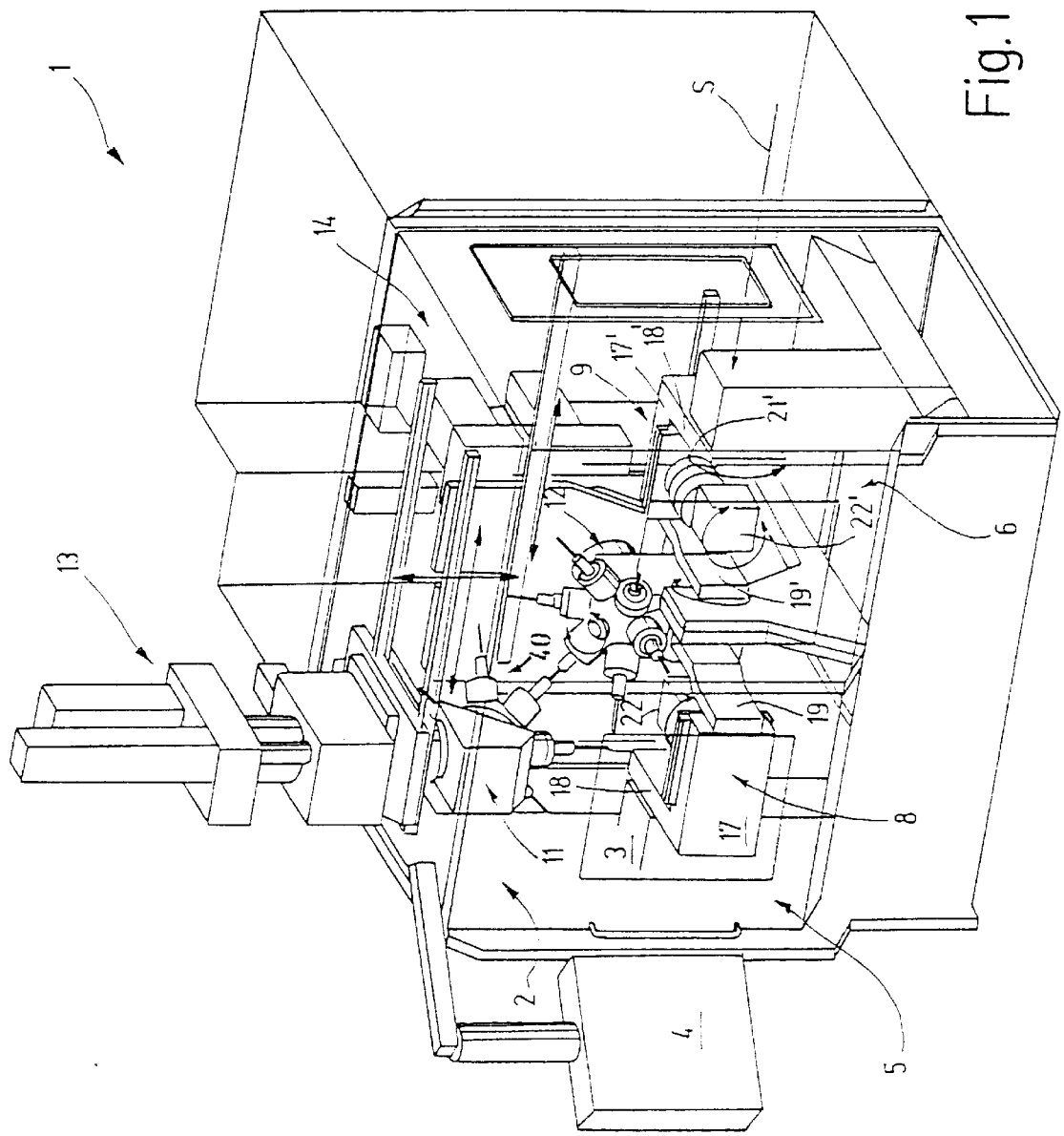

The invention relates to a machine tool, in particular for metal-cutting machining of workpieces.

BACKGROUND OF THE INVENTION

For machining workpieces of complex shape, which for their production must pass through a relatively large number of different metal-cutting machining processes, especially for mass-scale machining or production of such workpieces, machine tools are often used that on the same workpiece successively perform different machining operations from different directions. One example of such a machine tool can be found in U.S. Pat. No. 5,452,502. The machine tool disclosed there is embodied as a circular indexing machine tool and has a cross-shaped workpiece carrier disposed inside a cage-like base frame. Workpiece receptacle devices are disposed on the side faces of the arms of the cross-shaped workpiece carrier. While the workpiece carrier can be rotated and indexed about a vertical axis, the individual workpiece receptacles are each rotatable about horizontal axes, which are disposed at a tangent to an imaginary circle. As the workpiece carriers index onward, the workpieces successively pass through different work stations. These stations are defined by machining units, which are retained on the basic frame so as to be adjustable in multiple directions. Each machining unit has one work spindle, which is provided with a revolver head. The revolver head is embodied as a crown type turret head. Its spindles are driven jointly by the work spindle. By revolution of the revolver head, a desired tool can be transferred into a rectilinear lengthening position of the work spindle, thus putting it in the machining position. All the spindles of the revolver head are driven simultaneously, and they continue to move even during the rotation or onward indexing of the revolver head.

With this circular increment machine tool, five-sided machining of the workpieces is possible, which makes for high efficiency. However, oblique faces or oblique bores, that is, bores that do not form a right angle with the axis of rotation (horizontal axis) of the workpiece, present a certain problem in machining. In special cases, in which because of the workpiece design different machining times are needed in the various work stations, it is also possible that the machining units of different work stations may work for variously long times. The indexing time is determined by the longest machining time required.

SUMMARY OF THE INVENTION

With this as the point of departure, it is the object of the invention to provide a remedy for this and to create a machine tool with which the most uninterrupted possible operation of individual work spindles and thus a high degree of utilization are attainable even if individual sides of the workpieces have to be machined for variously long times.

This object is attained according to one aspect of the invention that makes it. In its simplest structural form, the machine tool has a machining unit that serves two workpiece receptacles. Each workpiece receptacle is embodied such that it can pivot the workpiece into at least a mounting or removal position and into at least one defined position but preferably a plurality of selectively definable work positions. The pivot axis preferably passes crosswise through the workpiece and in the ideal case through its center. Preferably, the pivot axis does not touch or intersect the workpiece fastening face but instead extends parallel to it and spaced apart from it.

Both workpiece receptacles are disposed in the immediate vicinity of one another, and the machining unit can be moved by means of the guiding and adjusting device in such a way that it machines either one or other workpiece. Since the time required for changing workpieces is as a rule substantially shorter than the machining time, it is thus possible to keep the workpiece in action practically constantly. Inactive times, as otherwise can occur if it is necessary to wait for other work spindles or in a change of workpieces, can be averted.

While the work spindle is adjustable in the lateral direction along its travel, the length of which spans both workpiece receptacles, it is adjustable in an additional direction perpendicular to the lateral direction and to its axis of rotation. It is also adjustable in the direction of its axis of rotation, to enable a positioning motion. These three axes enable flexible machining of the workpieces.

All the NC axes (the X, Y, and Z axes, as well as the pivot axis S and adjusting axis V) serve the purpose of positioning in machining a workpiece. Thus the workpiece is transported from the loading position to the work position at the same time, so that no additional transport axis or motions are required. If needed, however, an additional transport axis may be provided.

In an advantageous embodiment, at least two machining units are provided, whose work spindles are for instance at a right angle from one another. Both machining units are adjustable in the lateral direction far enough that they can machine both workpieces in alternation. The machining units can either both work on the same workpiece or on different workpieces. In conjunction with the possible pivoting of the workpieces about the pivot axis, this enables a compensation of the possibly variably long machining times for different sides. For instance, if machining the end face of the workpiece, which is opposite its fastening face, is especially labor-intensive, then both the machining units can be used for that. While the first machining unit can machine the first workpiece on its face end, the second machining unit, which is oriented differently, can machine the correspondingly pivoted other workpiece on its face end. If the machining of side faces is less labor-intensive, then this machining can for instance be performed by a single machining unit, which to that end is moved suitably laterally to one or the other workpiece.

The advantages of the novel machine tool become especially apparent if the work spindles are provided with revolver heads or crown type turret heads. If the spindles present in these revolver heads and each carrying one tool are driven from the central work spindle, and if the onward indexing of the crown type turret heads takes place while the spindles are moving, then extremely short changing times, which are less than one second long, are achieved. Work can thus be done practically uninterruptedly. The high flexibility that the machine tool of the invention offers in terms of dividing up the individual operations among individual machining units and tools, makes it possible here for the existing work spindles to be utilized equally, so that the idle times of the machine can be kept quite low.

In a preferred embodiment, the two workpiece receptacles are disposed adjacent one another and side by side, and the pivot axis is oriented horizontally. This has the advantage that the workpieces can each be changed at the same height, and that a relatively flat machine frame can be used, which can easily be designed to be rigid. This is favorable for the machining precision.

The two machining units are preferably oriented in different directions in space. For example, the first work spindle is disposed horizontally and the second work spindle is disposed vertically. This makes it possible for both machining units to work on the same workpiece at once. The machine tool can as a result be programmed quite flexibly, and it is even possible for workpieces that require quite different machining times on different sides to be machined without stopping or idly running individual work spindles. Furthermore, the work spindles can be moved past one another without colliding with one another (for instance, the first work spindle can be moved from the first to the second workpiece and the second work spindle can be moved from the second to the first workpiece).

A height adjustment of the workpiece with respect to its workpiece receptacle, or in other words an intended adjustment of the spacing between the center of the workpiece and the workpiece receptacle makes it possible, when differently fastened workpieces are being pivoted, for their respective centers to remain on the pivot axis. This not only simplifies programming of the machine tool but furthermore reduces the necessary travel distances of the machining unit, which again reduces the idle times.

If the workpiece receptacle moreover has a rotary positioning unit, by means of which the workpiece can be rotated about an adjusting axis at right angles to the pivot axis, then with the machine tool, even with a single machining unit, genuine five-sided machining is possible. For instance, if a single horizontal work spindle is present, then with the tool the end face of the workpiece can be machined when it is in a horizontal pivoted position, in which the adjusting axis is oriented horizontally, and the side faces can be machined when the workpiece is pivoted such that the adjusting axis is oriented vertically. This advantage becomes all the more important if at least two machining units are provided.

The machine tool of the invention is especially flexible if the positioning units for pivoting the carriers of the workpiece receptacles are positionable practically arbitrarily. In such a machine tool, it is easily possible to make oblique bores, machine oblique faces, and the like without requiring angled drilling heads or similar expensive contrivances. In particular, the angles of the oblique bores or oblique faces to the adjusting axis of the workpieces can be adjusted easily by programming the machine tool. Additional fixtures or the like (hardware) are unnecessary. The machining units upon each machining operation execute merely a single positioning motion parallel to the axis of rotation of the work spindles. This minimizes the effort and expense of control in comparison with guiding angled drilling heads, which require simultaneous adjustment of two axes in order to attain an advancing motion. Practically any machining direction can be selected, which goes beyond the conventional five-sided machining.

As needed, the machine tool can be constructed as a twin machine with two workpiece receptacles and one continuous machine frame. It is also possible to divide up the machine frame in terms of workpiece receptacles such that individual units, each with one workpiece receptacle, are obtained. These units can then be cascaded, so that by connecting two units to one another a twin machine is obtained, and by connecting three units to one another, a triplet machine is obtained.

If such a machine tool as described above is provided with, then the engineering expense is markedly less than for the design with correspondingly smaller machine tools, each with individual fastening places. Once again, this makes for a cost saving.

Finally, conversion of existing machine tools is possible, by mounting double or multiple workpiece fastening places on existing fastening places or carriers, optionally without planetary tables. The same is true for the spindles, which can be doubled with suitable accessory devices. Thus in the basic design, machine tools suitable even for machining relatively large, complicated workpieces, can be converted for twin or multiple machining of smaller workpieces, and thus the part rejection rate can be double or multiplied further at little expense and without any loss of quality.

The individual workpiece fastening places can be connected with separate rotary positioning devices as needed. In a preferred embodiment, however, the rotary positioning devices have a common drive mechanism, and both fastening places are automatically moved in synchronized fashion. The adjusting axes of the individual workpiece receptacle devices, as in a machine tool with single fastening places, are preferably defined at right angles to the pivot axis of the carrier.

The machining units preferably have not merely a single pair of spindles but rather a revolver head equipped with a plurality of spindle pairs. Rotating the revolver head causes the spindles to change their position in pairs; machining the two workpieces retained at adjacent fastening places is therefore fully synchronized and has the same quality. The revolver head, which has either twin spindles or four spindles per revolver station, is preferably a crown type turret head. The spindles can be supported in an attachment to be mounted on a conventional crown type turret head; this makes it easier to convert machine tools from a single spindle per station to double spindles or four spindles per station.

In its preferred embodiment, the machine tool has two carriers and two machining units, whose main axes or work spindles are perpendicular to one another. Here the advantages of a machine tool with single (not double) spindles and workpiece receptacles apply accordingly.

BRIEF DESCRIPTION OF THE PREFERRED EMBODIMENTS

Figure 2:
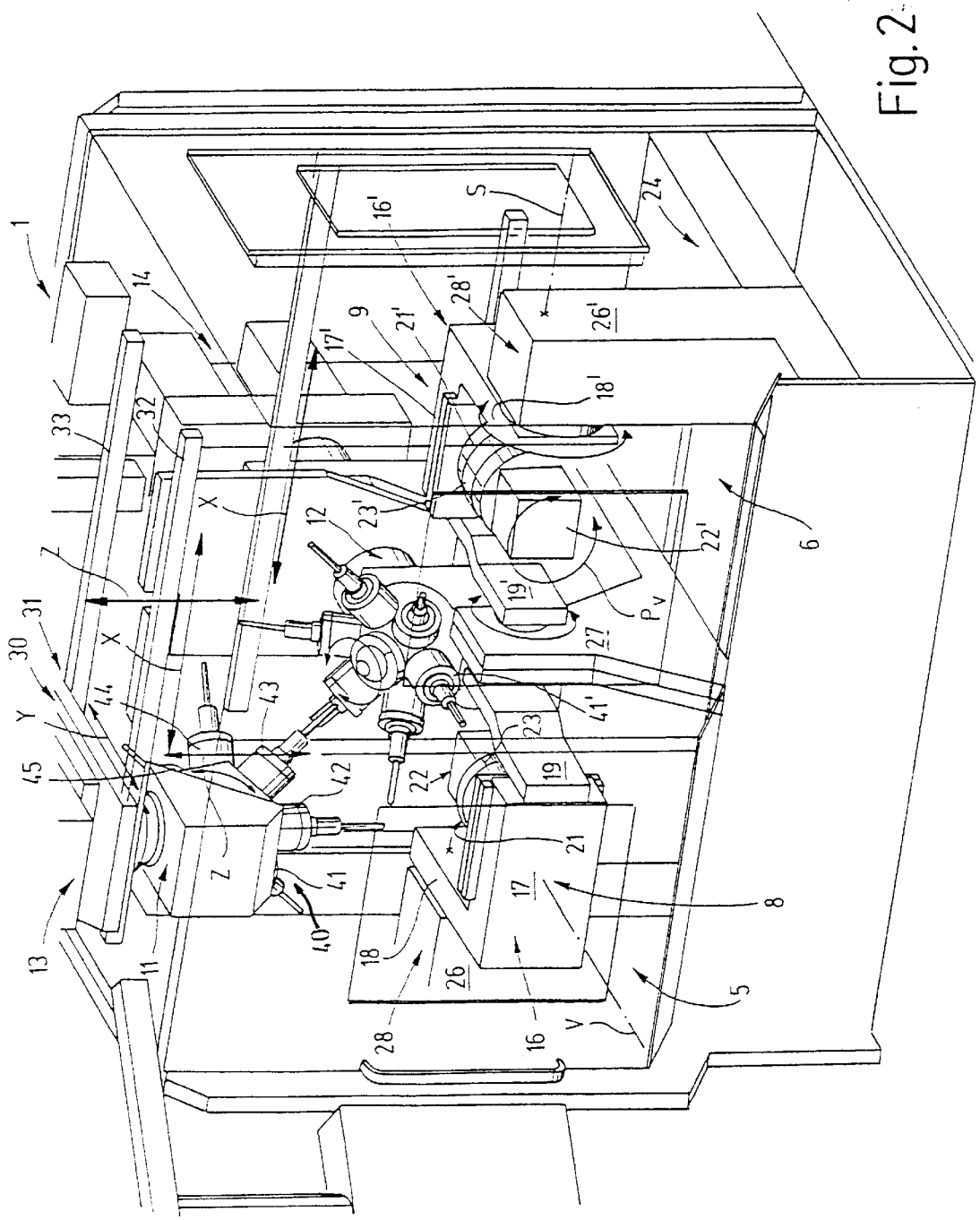
Figure 2A:
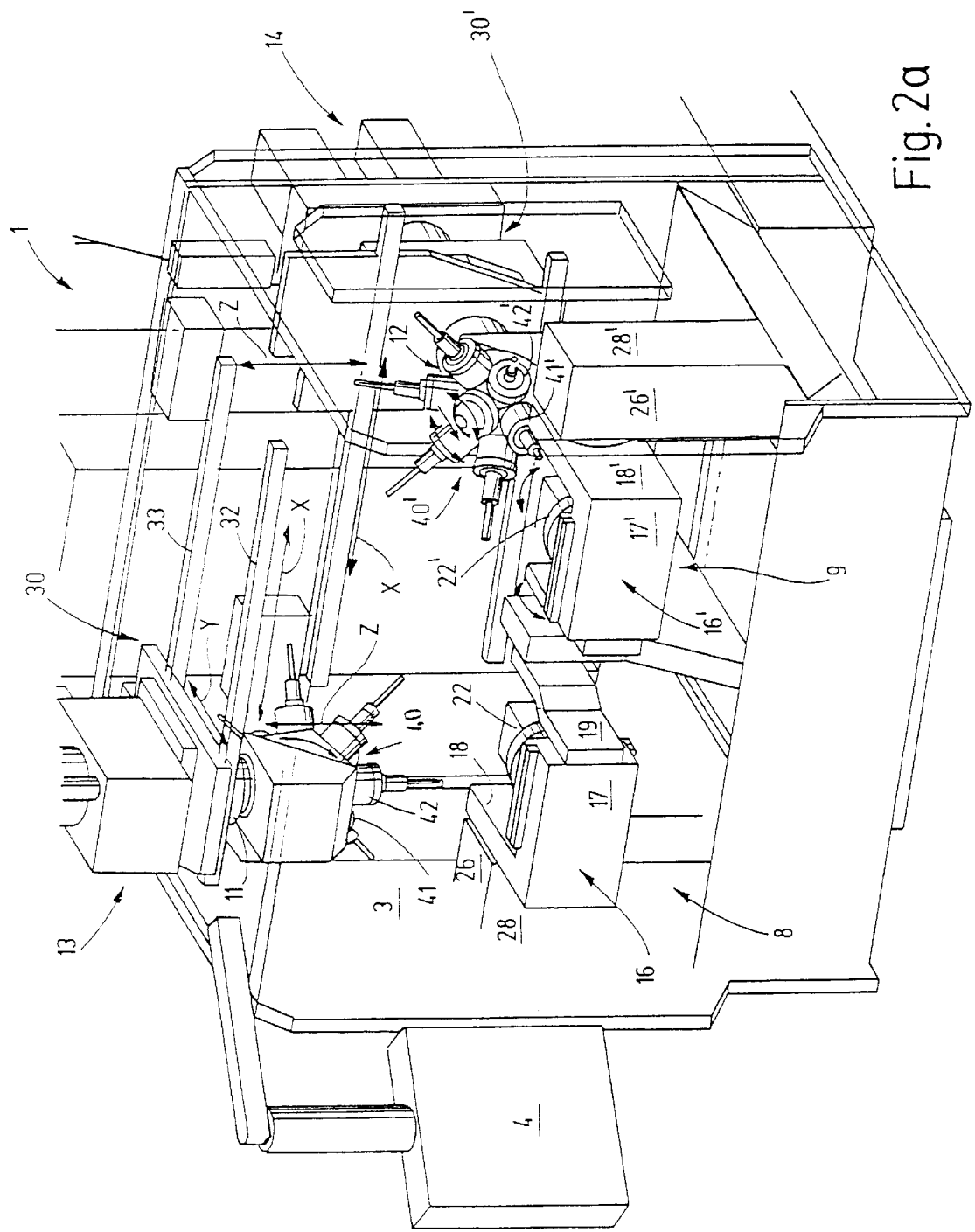
Figure 3:
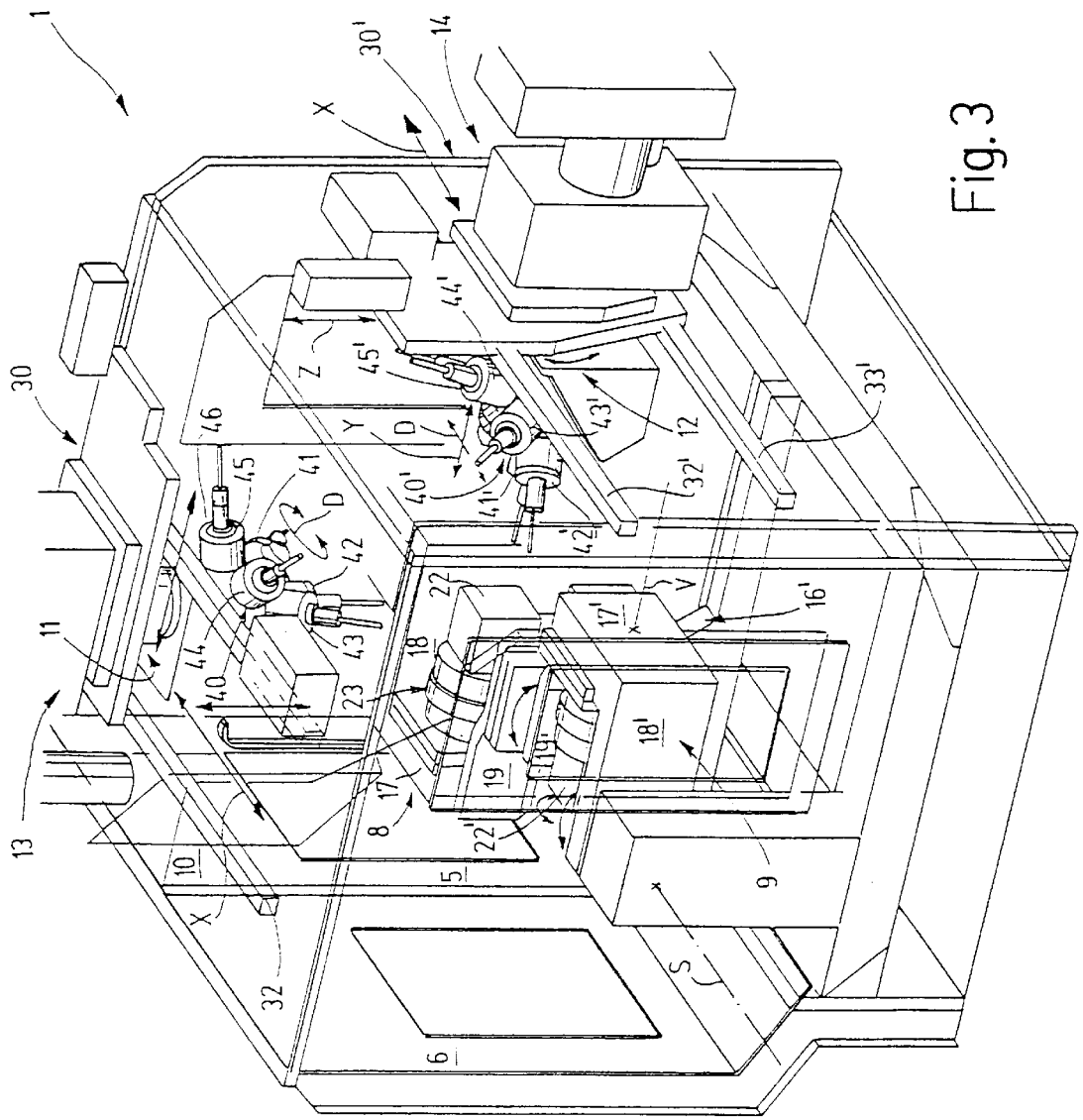
Figure 4:
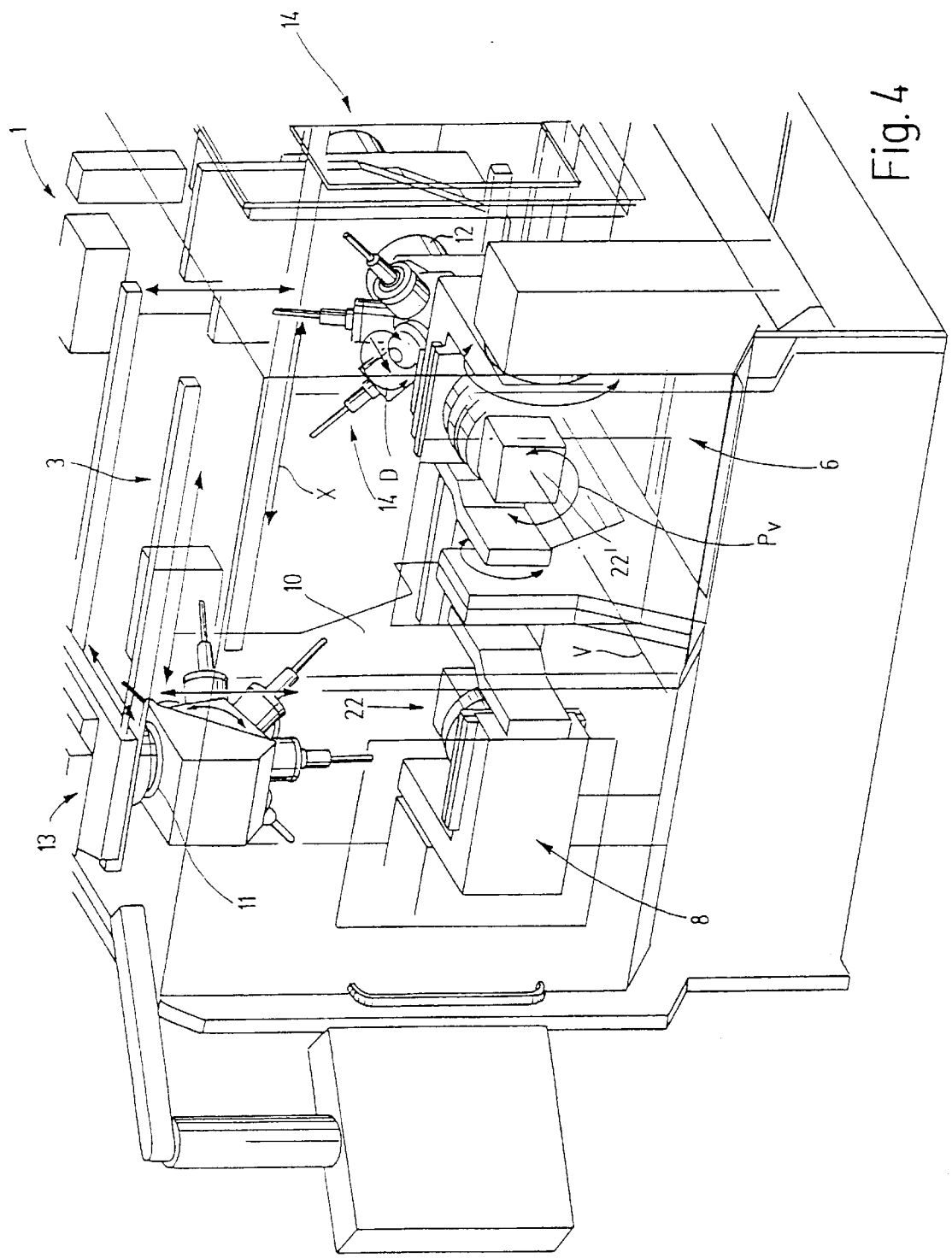
Figure 4A:
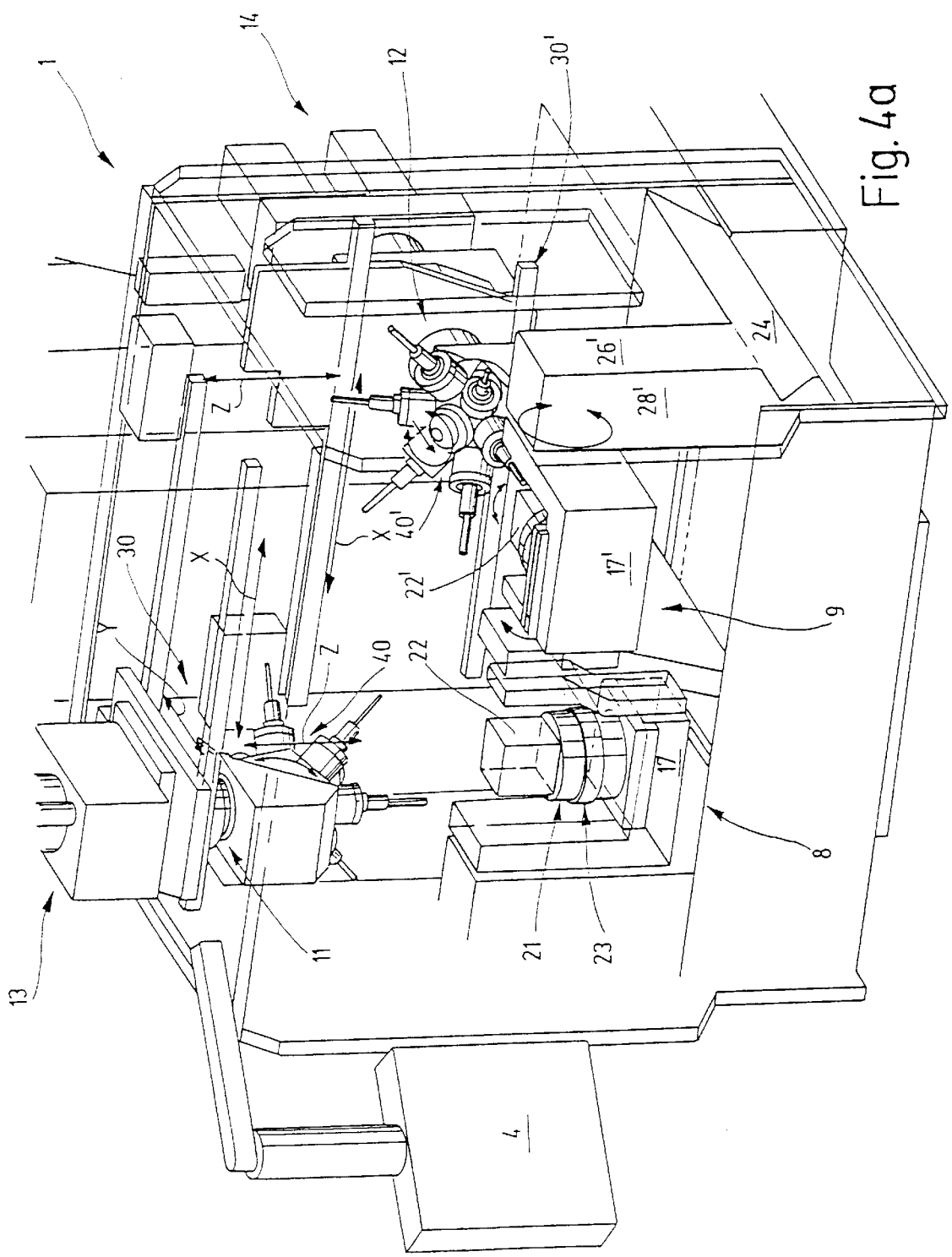
Figure 4B:
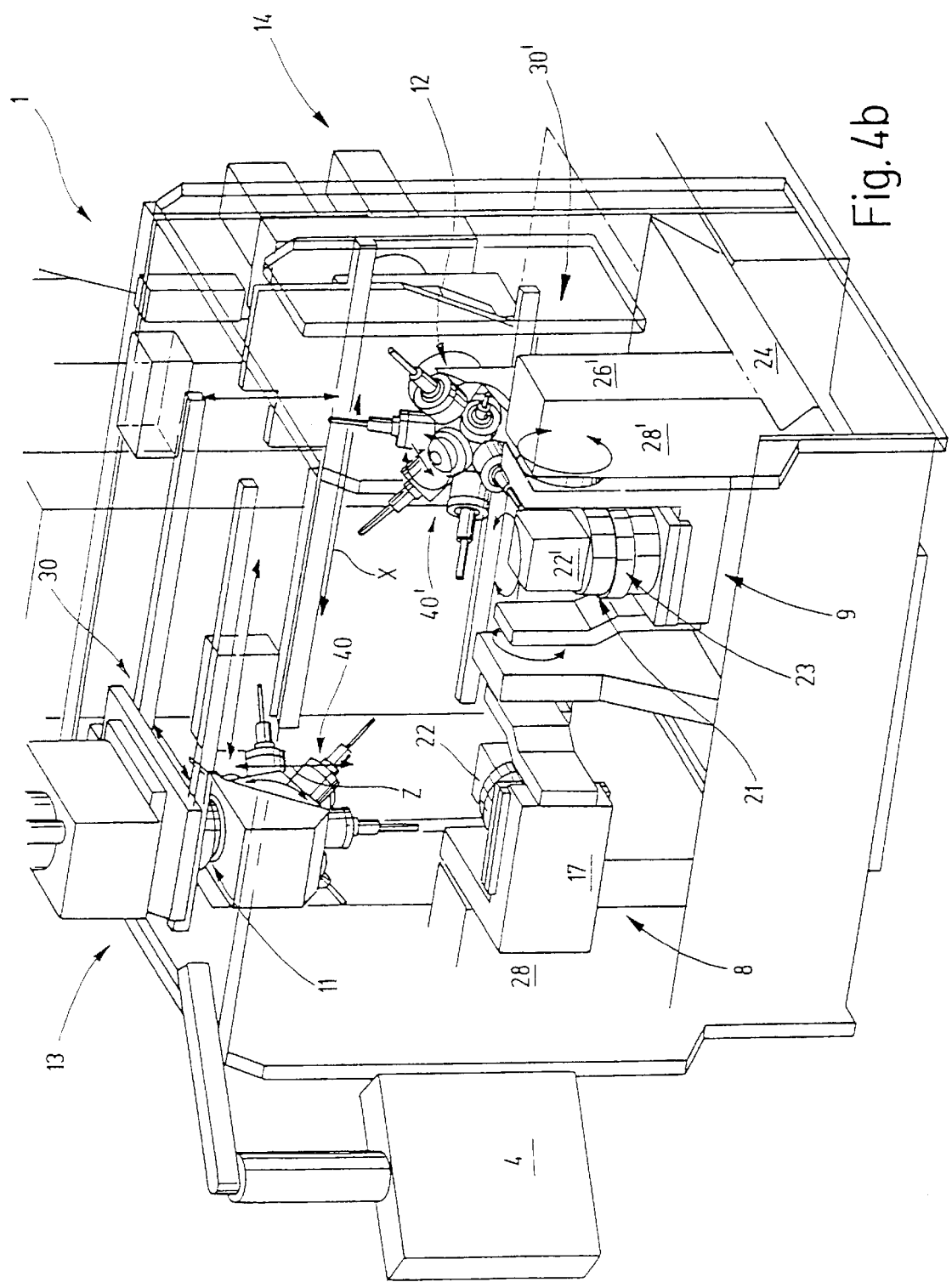
Figure 5:
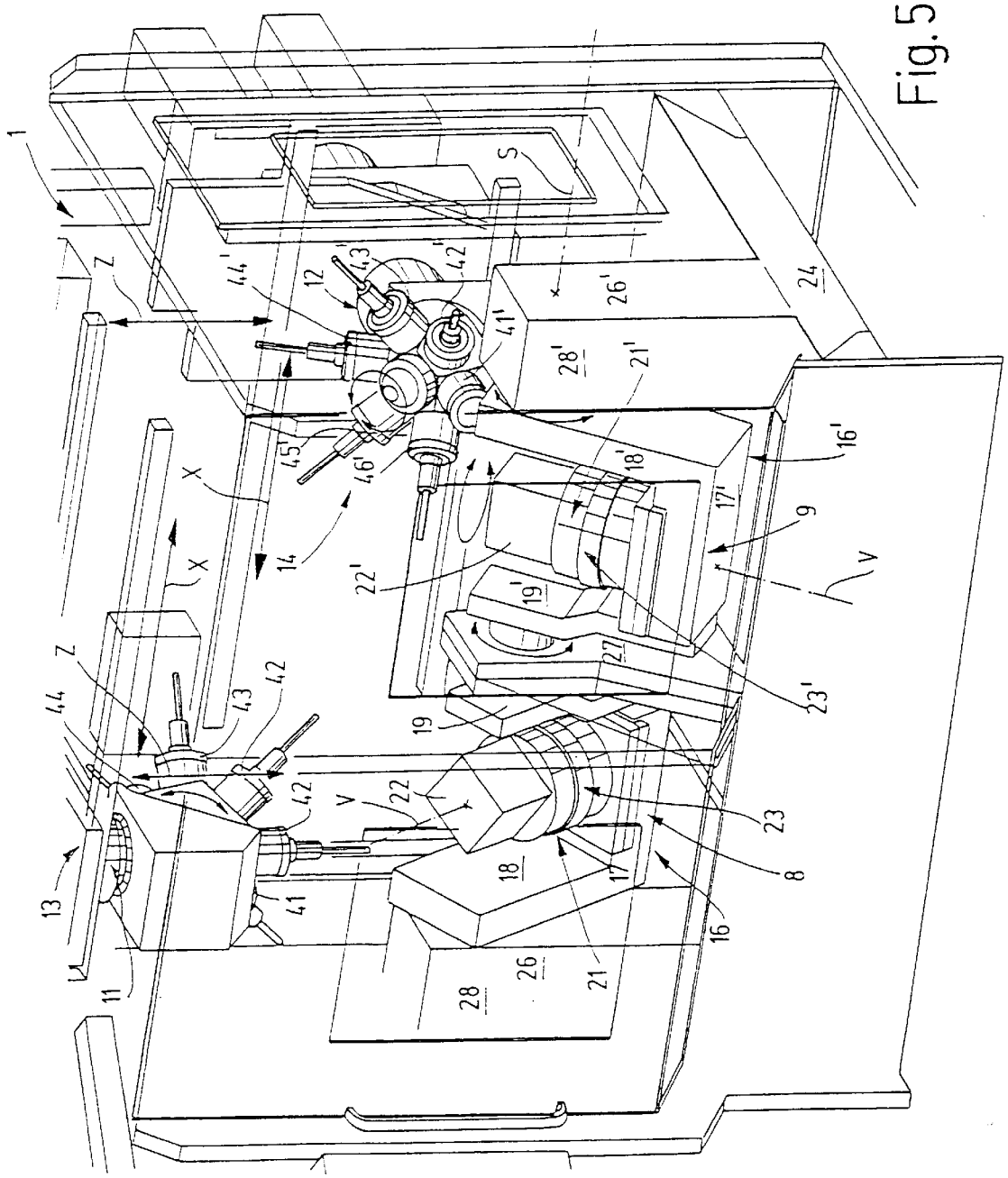
Figure 6:
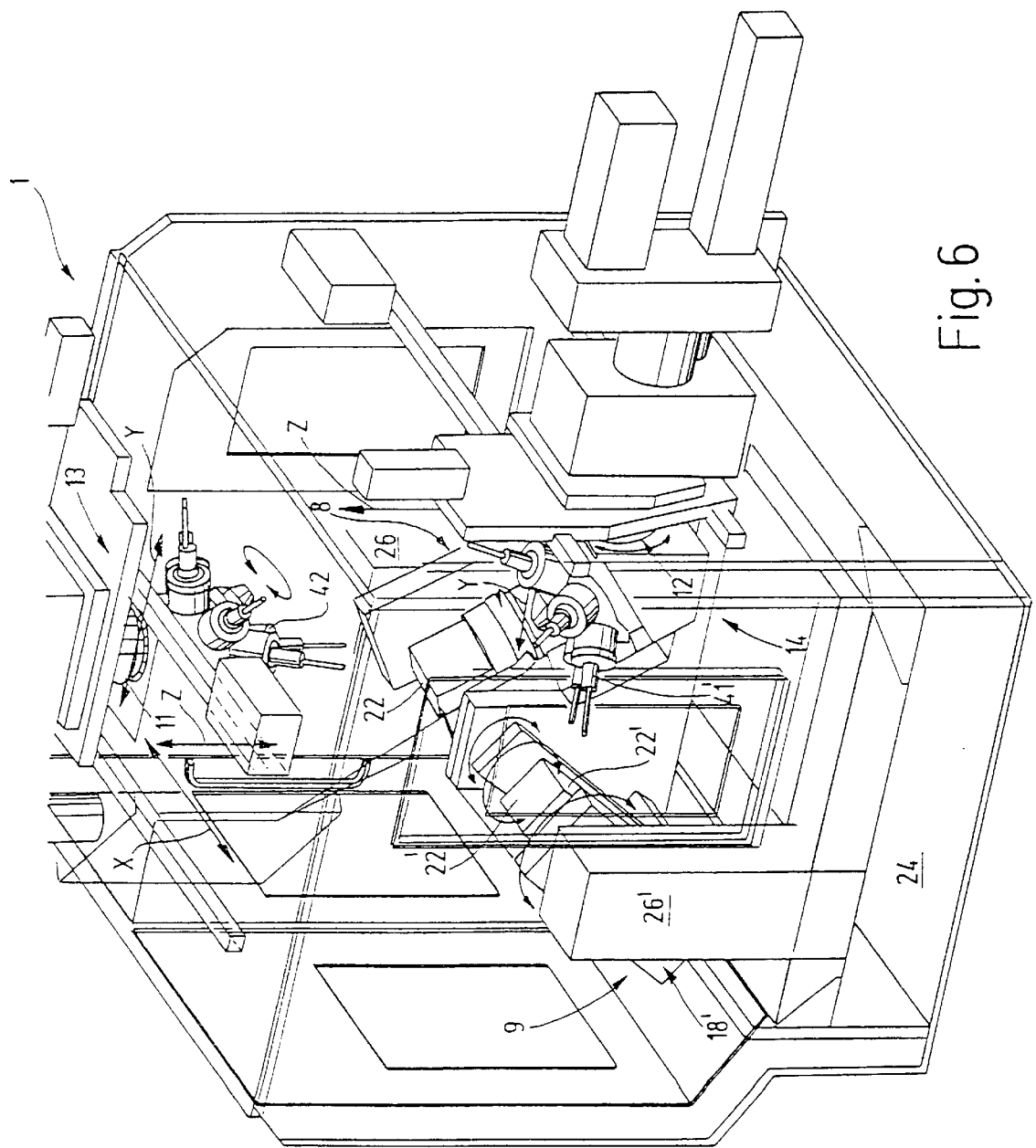
Figure 7:
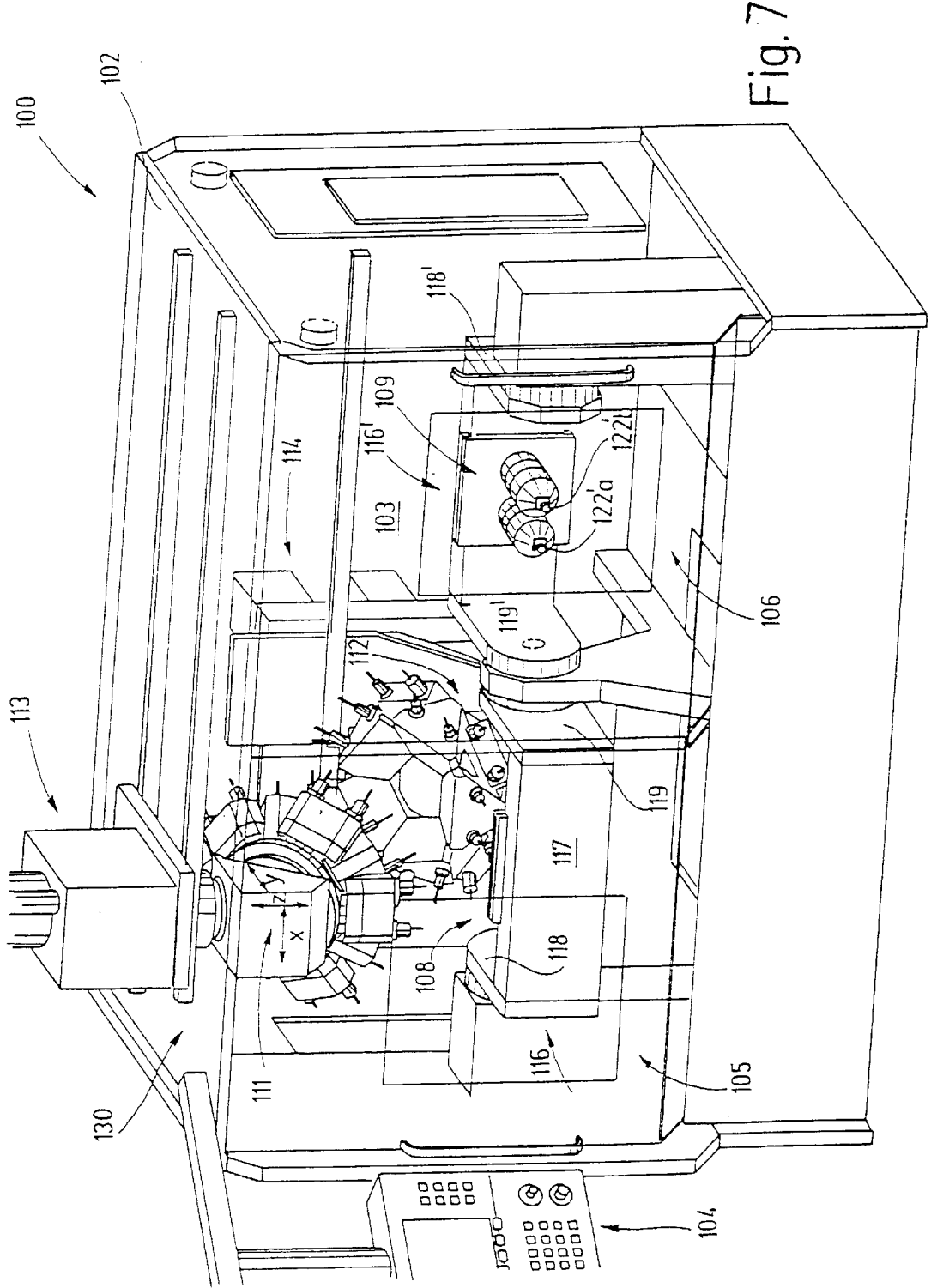
Figure 8:
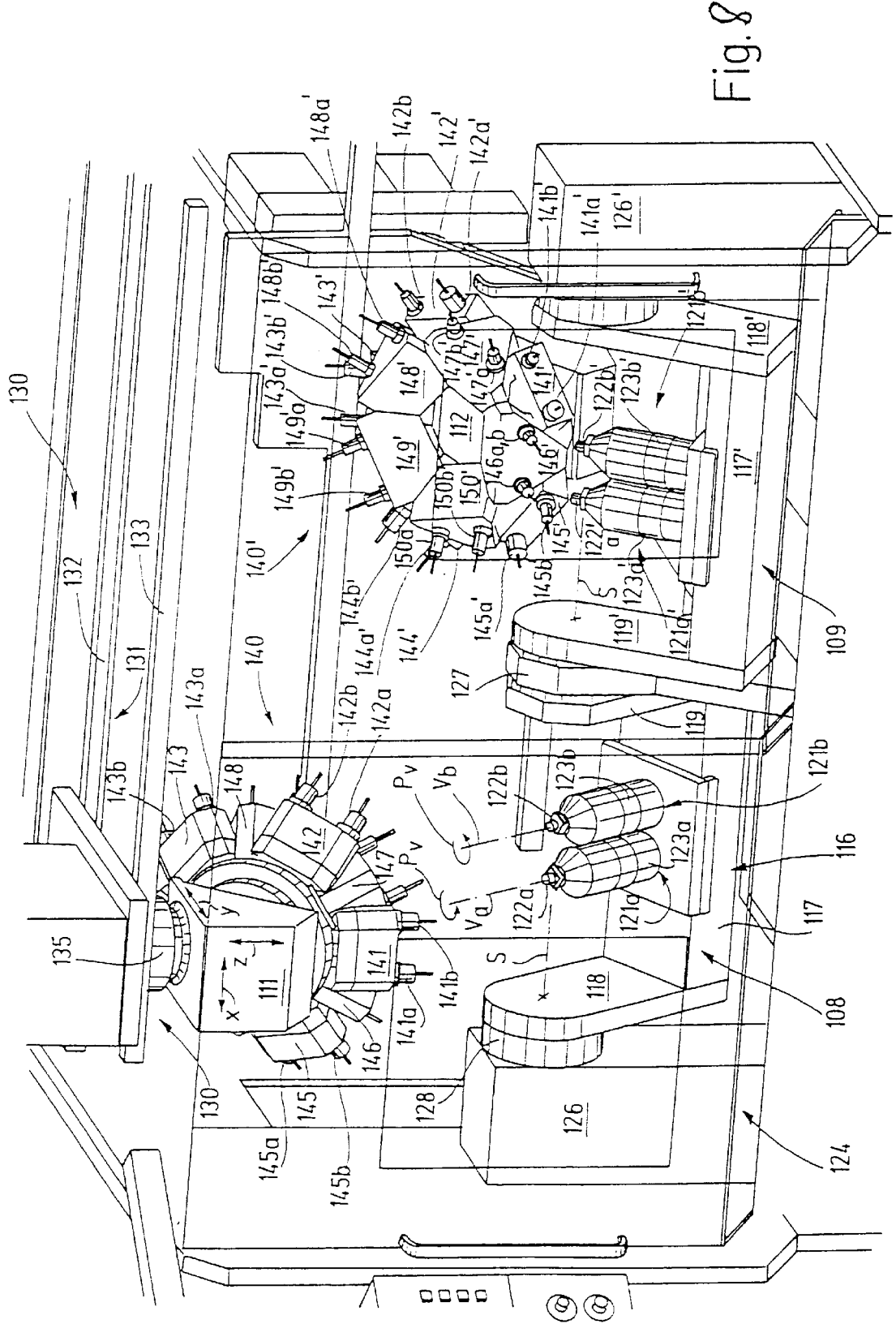
Figure 9:
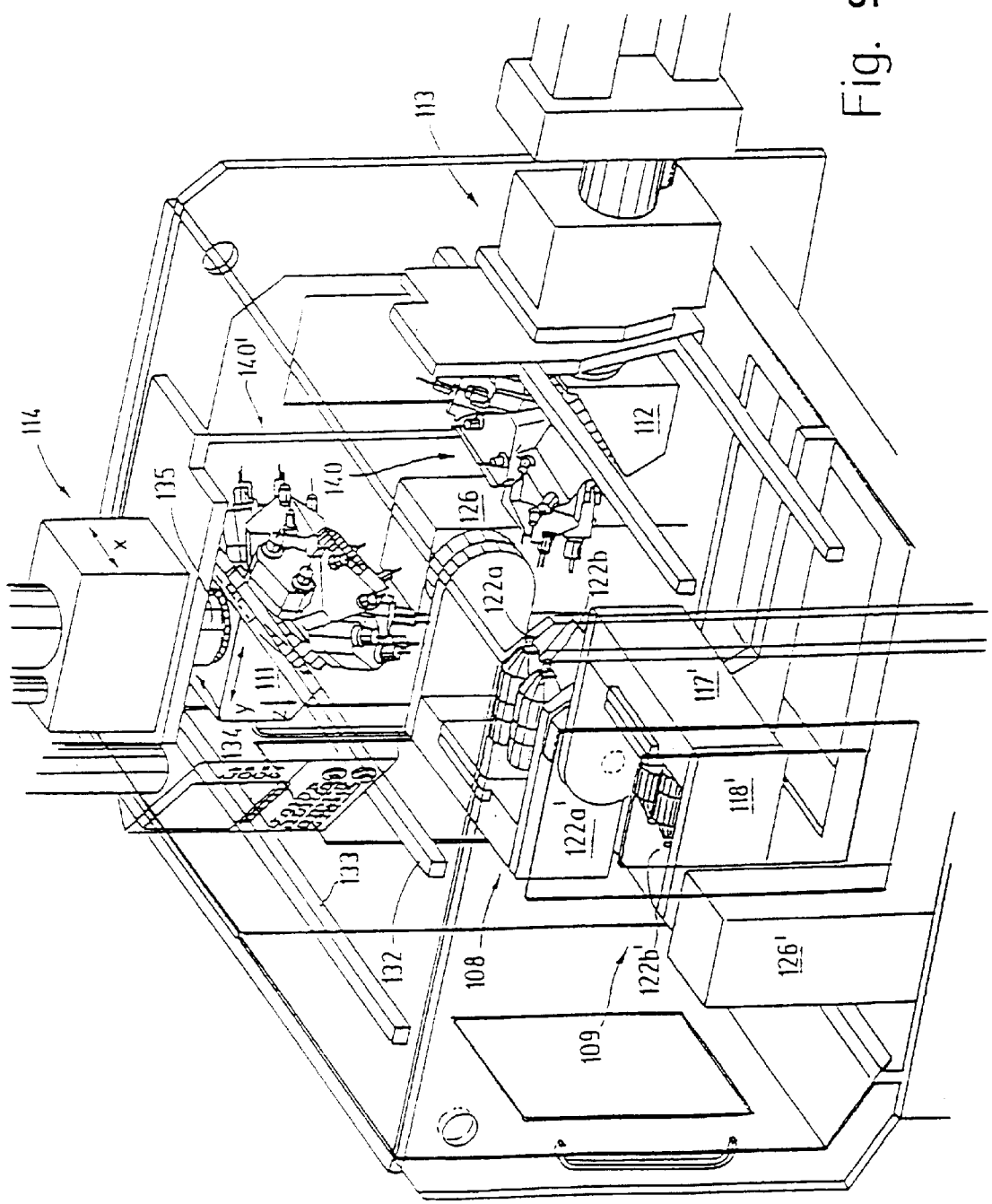

Further advantageous details will become apparent from the dependent claims, the ensuing description, and the drawings. In the drawing, a single exemplary embodiment of the invention is shown for purposes of illustration. Shown are:

FIG. 1, the machine tool of the invention in a simplified perspective view, in which the outer machine covering has been shown transparent for the sake of illustration;

FIG. 2, the machine tool of FIG. 1, on a different scale;

FIG. 2a, the machine tool of FIG. 2, in a different operating state;

FIG. 3, the machine tool of FIGS. 1 and 2, in the same work position, in a perspective view seen from a different direction;

FIG. 4, the machine tool of FIGS. 1 through 3, with machining units in different work positions, shown from a standpoint matching that of FIGS. 1 and 2;

FIG. 4a, the machine tool of FIG. 4, in a different operating state, which differs from the operating state of FIG. 4 in terms of the pivoted positions of the workpiece receptacles;

FIG. 4b, in a further operating state;

FIG. 5, the machine tool of FIGS. 1 through 4, with workpieces pivoted into different machining positions;

FIG. 6, the drive mechanism of FIGS. 1 through 5, in the work position seen in FIG. 5, from a different standpoint;

FIG. 7, another embodiment of the machine tool in a complete perspective view, in which the machine tool is shown schematically and partly transparent, for the sake of illustration, with a tool carrier in the loading position;

FIG. 8, the machine tool of FIG. 7, in a schematic perspective view, and with both tool carriers in the work position; and FIG. 9, the machine tool of FIG. 7, in the work position of FIG. 1, in a different perspective view.

In FIG. 1, a machine tool 1 is shown, which has a work chamber 3 enclosed by a housing 2. This work chamber is separated from its surroundings, and control elements 4 that are required are disposed outside the work chamber 3. On its front side, the housing 2 can be opened as needed by means of two swiveling or sliding doors 5, 6, to gain access to the work chamber 3. In this chamber, there are two workpiece receptacles 8, 9 and work spindles 11, 12. The work spindles 11, 12 belong to machining units 13, 14, which include suitable drive devices for the work spindles 11, 12.

From the somewhat larger illustration in FIG. 2, it can be seen how the workpiece receptacles 8, 9 and work spindles 11, 12 are disposed and embodied. The workpiece receptacle 8 has a U-shaped carrier 16, on whose crosspiece 17, between two legs 18, 19 extending away from the crosspiece 17, a workpiece receptacle device 21 is disposed. This device is provided with chucking means for detachably retaining a workpiece 22. The workpiece receptacle device 21 is also embodied such that it can rotate the workpiece 22 about an adjusting axis V, which extends parallel to the legs 18, 19 and is perpendicular to the crosspiece 17. To that end, an adjusting device 23 is used, which is disposed between the crosspiece 17 and the chucking device. The rotation about the adjusting axis V is shown in FIG. 2 on the right-hand side in terms of an arrow $P_V$ in conjunction with the workpiece receptacle 9.

The entire carrier 16 is pivotable about a pivot axis S. To that end, the legs 18, 19 of the carrier 16 are supported, on their ends remote from the crosspiece 17, on a machine frame 24, which to this end has vertically-upward-extending columns 26, 27. A positioning unit 28, which allows pivoting of the carrier 16 by at least 90 and preferably 180 degrees or more is disposed in the column 26. The positioning unit is also embodied such that it can define both the position shown in FIG. 2, in which the adjusting axis V is oriented horizontally, and some other definable position. These positions are preferably finely graduated or can be defined arbitrarily. To that end, the positioning unit is provided with an NC axis. An alternative possibility is a positioning unit that is coupled with a serration, which defines discrete predetermined positions that are close together.

With respect to an imaginary vertical center plane between the workpiece receptacle 8 and the workpiece receptacle 9, the workpiece receptacle 9 is embodied mirror-symmetrically to the workpiece receptacle 8 and otherwise is identical to it. Without further reference and explanation, the reference numerals used in conjunction with the workpiece receptacle 8 will also be used for the workpiece receptacle 9, provided with a prime for the sake of identification and distinction. The same is true for the column 26 and the positioning unit 28. A fixed or movable partition wall 10 is disposed between the workpiece receptacles 8, 9; in particular, this prevents coolant and metal chips from passing the workpiece receptacles 8, 9.

Neither the workpiece receptacle 8 nor the workpiece receptacle 9 is fixedly assigned to one of the machining units 13, 14. Instead, these machining units are provided equally for both workpiece receptacles 8, 9. A guiding and adjusting device 30 to that end allows the targeted adjustment of the work spindles 11 in three directions in space X, Y, Z that are structurally perpendicular to one another, and one of these directions in space coincides with the axis of rotation. To that end, the machining unit 13 is guided via a linear guide 31, whose guide rails 32, 33 are schematically indicated in FIG. 2. The linear guide 32 is part of an nc axis, which acts in the lateral direction X. This direction is represented by an arrow X in FIG. 2 and is oriented to the parallel pivot axis S. The work spindle 11 of the machining unit 13 is additionally adjustable in a direction Y perpendicular thereto, and therefore there are again a corresponding linear guide and an NC axis. However, while the adjustment travel of the linear guide 31 in the X direction is so great that the work spindle can be brought both to the workpiece 22 and to the workpiece 22', the adjustment travel in the Y direction is substantially shorter. Here, an adjustment travel that corresponds to the dimensions of the workpiece 22 suffices.

The machining unit 13 additionally has a further NC axis, by means of which the work spindle 11 can be adjusted in the Z direction. The Z direction is oriented perpendicular to the X direction and to the Y direction and thus perpendicular to the pivot axis S. The Z direction forms the positioning direction for the work spindle 11.

On its end toward the workpiece 22, the work spindle 11 is provided with a revolver head 40, embodied as a crown type turret head. This revolver has a plurality of spindles 41 through 46, whose axes of rotation are disposed on an imaginary conical jacket. The revolver head 40 is rotatable into multiple work positions about an obliquely oriented indexing axis under program control via a system not further shown, and in each work position one of the spindles 41 through 46 is aligned with the work spindle 11. All the spindles 41 through 46 are driven from the work spindle 11, and they travel with it regardless of the particular pivoted position. Each spindle 41 through 46 is provided with a chuck for receiving a tool for metal-cutting machining of the workpiece 22. The tool located in a particular work position rotates about a vertical axis of rotation, which coincides with the axis of the work spindle. The other tools move past the workpiece 22 and thus run idly.

As seen particularly from FIG. 3, the work spindle 12 is also adjustable by means of three NC axes in the directions X, Y and Z, but in this case the Y direction is the positioning direction. The work spindle 12 is oriented horizontally in the Y direction. Linear guides and axes of the machining unit 14 agree in principle with guides and axes of the machining unit 13 and thus are provided with the same reference numerals. In other respects as well, the machining units 13, 14 are structurally identical, and in particular the work spindle 12, on its side toward the workpiece 22, is provided with a revolver head 40', which matches the revolver head 40 of the machining unit 13, so that the description of the latter applies to it accordingly. To the extent that the elements of the machining unit 14 match those of the machining unit 13, the same reference numerals are used, each with a prime to distinguish them. Each adjusting device 30, 30' thus enables an adjustment of the respective work spindle 11, 12 in the lateral direction X in an additional adjusting direction Y or Z and in a positioning direction Z or Y, respectively.

The mode of operation of the machine tool 1 described thus far is as follows:

As an example, it is assumed that the workpiece receptacles 8, 9 of the machine tool 1 are first located in the pivoted position shown in FIG. 1. The workpiece receptacle 9 has then been pivoted such that the cross piece 17' is located on the side of the pivot axis S pointing away from the door 6. The workpiece 22' is accessible from the door 6. A change of workpieces can now be made, for instance, by removing the workpiece 22', which has been completely machined previously, and introducing a new blank into the workpiece receptacle device 21'.

While the workpiece receptacle 9 is pivoted into a position suitable for the change of workpieces, the workpiece receptacle 8 is in a work position. In particular, both U-shaped carriers 16, 16' are oriented with their legs 18, 19, 18', 19' horizontally; the crosspiece 17 of the workpiece receptacle 8 points toward the door 5. As seen particularly from FIGS. 2 and 3, both machining units 13, 14 are at the workpiece receptacle 8 that retains the workpiece 22. Because the work spindles 11, 12 of the machining unit 13, 14 form a right angle with one another, they can both be active at the same time. For instance, with the tool of the spindle 42, a side face of the workpiece 22, which is shown merely as an example as a cube, is machined while the tool of spindle 41' is machining the face end of this workpiece. The tool desired or required for this is brought into the machining position by rotating the applicable revolver head 40, 40'. The respective rotary motion is represented by arrows D in FIG. 3. The rotation of the revolver heads 40, 40' is effected without stopping the applicable work spindle 11, 12 that drives all the spindles of the revolver head 40, 40' synchronously.

By rotating the workpiece 22 about its adjusting axis V by means of suitable triggering of the adjusting device 23, a different side face can be made to face upward and thus be machined by the machining unit 13. In succession, all four sides of the workpiece 22 can thus be machined. Intermediate positions can be set as needed as well.

The machine tool 1 permits uniform utilization of the machining units 13, 14. For instance, if the workpiece 22 requires an approximately equal-length machining time for each of its five sides, and if the machining time of one side is equivalent to approximately that required for the change of workpieces, then the workpiece receptacle 9 is pivoted out of the workpiece changing position, shown in FIGS. 1 through 3, into a vertical position (FIG. 4b) in which the legs 18', 19' and thus the adjusting axis V of the workpiece 22' extend in the vertical direction. The machining unit 14 is now moved in the X direction to the workpiece receptacle 9, and a first side face of the workpiece 22' can be machined.

Once this has been done, and once the workpiece 22 has in the mean time been machined to completion, the workpiece receptacle 9 can be pivoted into a horizontal position, as shown in FIG. 2a. (During this time, the workpiece receptacle 8 can also be pivoted vertically, as in FIG. 4a.) In the horizontal position of the workpiece receptacle 9, the crosspiece 17' is retained on the side of the pivot axis S located at the door 6. While the machining unit 14 can now machine the end face of the workpiece 22', the machining unit 13 is brought over to the workpiece 22' and can machine the remaining three side faces in succession. Thus three faces to be machined fall to the machining unit 13 to do, while the machining unit 14 has two faces to machine.

This applies accordingly for machining the workpiece 22 in the workpiece receptacle 8. Once again, the machining of the end face and of the four side faces can be distributed between the machining units 13, 14 in such a way that both machining units 13, 14 are active practically constantly. Idle times or time losses in which a work spindle 11 or 12 is idling, while in the final analysis it waits for the other work spindle to finish its machining operation, can be minimized or even omitted entirely. To further equalize the machining times, it is for instance also possible for the machining unit 13 to machine three side faces at the machining unit 9 and for the workpiece receptacle 14 to machine one side face and one end face, while for the workpiece receptacle 8 the conditions are precisely the reverse. Thus via both workpieces 22, 22', precisely five sides to be machined fall to each machining unit 13, 14.

Both workpiece receptacles 8, 9 can be pivoted independently of one another into arbitrary or nearly arbitrary positions. It can thus be assured that loading of a workpiece receptacle 8 or 9 does not impede the work at the respective other workpiece receptacle 9 or 8. In contrast to known circular indexing machine tools, in the machine tool 1 the workpieces are not actually transported; that is there is no shift in the location of the center of a respective workpiece 22, 22'. Instead, the machining units 13, 14 are moved between the workpiece receptacles 8, 9. The motion of each workpiece 22, 22' is limited to two superimposed rotary or pivoting motions, namely the pivoting motion about the pivot axis S and the adjusting motion about the adjusting axis V. In both rotary or pivoting motions, the center of the respective workpiece 22, 22' remains essentially in place. The machining units 13, 14, contrarily, execute only linear adjusting motions in three axis X, Y, Z. Only if needed can one additional pivot axis be provided for the machining units 13, 14.

The pivoting motion of the workpiece receptacles 8, 9, which is both a transporting and a positioning motion for the workpieces 22, 22', enables not only the adjustment of various machining positions, but also an expedient way to remove chips. When the workpieces 22, 22' are pivoted into different positions, chips that have been produced and collected can drop downward or given a suitable speed can also be removed by centrifugal motion.

Once the workpiece 22' has been machined to completion, then from its vertical position, for instance, it is pivoted back onto the door 6, as shown in FIG. 4, and the machining unit 14 is now moved laterally in the X direction to the workpiece receptacle 8 and the workpiece 22, in order to perform machining operations there. The workpiece 22' can now be changed. Two enable access to the workpiece 22', while machining is being done on the workpiece 22, the fixed or separately actuatable wall 10 divides the work chamber 3 into half-chambers.

The machine tool 1 enables not only equal utilization of the machining units 13, 14 but furthermore very great flexibility in terms of the machining of the workpieces 22, 22' from different directions in space. This can be seen particularly from FIGS. 5 and 6. Here, the machine tool 1 is used to machine relatively complicated workpieces, which for instance have oblique bores and/or oblique faces. The workpiece receptacles 8, 9 are each pivoted into positions in which the vertical axes V of the workpieces 22, 22' form an acute angle with the vertical. Without the aid of oblique drilling heads or other means for angular adjustment of the tools retained in the spindles 42, 41', oblique bores are attained in this way, and oblique faces can be milled.

Rotating the workpieces 22, 22' about their respective adjusting axis V by means of the adjusting device 23, 23' makes it possible to define the machining directions practically arbitrarily. If curved or spherical faces are to be machined, it is moreover possible to adjust the workpieces 22, 22' in a targeted way while the respective tools are in engagement with the workpiece 22, 22'. The motions of the positioning units 28, 28' and of the adjusting units 23, 23' are controlled, independently of one another, by the electronic control unit, not further shown, which is connected to the control elements 4. Thus making oblique bores and machining oblique faces does not impede the overall course of the machining operations. If the machining unit 13 is machining one side face from a direction perpendicular to it, for instance, then the other machining unit 14 can be performing oblique machining of the other workpiece.

If the machine tools are to be arranged for a different series of workpieces, then the workpiece receptacle devices 21, 21' are adjusted to the new workpieces in such a way that their respective centers are located at least approximately on the pivot axis S. This is attained by adjusting the height, that is, the spacing from the pivot axis S, of the fastening plane, which is defined by the face of the workpiece 22, 22' opposite the face end.

In an extreme case, the machine tool 1 makes it possible to machine different workpieces in the two workpiece receptacles 8, 9. For instance, the workpiece receptacle can be arranged for a first type of workpiece, and the workpiece receptacle 9 can be arranged for a second type of workpiece. If the requisite machining times of the different sides of the two types of workpiece differ then a certain equalization can be attained here, because each machining unit 13, 14 serves both workpiece receptacles 8, 9, so that once again both machining units 13, 14 are optimally utilized.

A machine tool 1 has at least one but preferably two machining units 13, 14, which are assigned to two workpiece receptacles 8, 9. The machining units 13, 14 are adjustable in three axis X, Y, Z, and they can each reach both workpiece receptacles 8, 9. The machining units 13, 14 are oriented such that their work spindles 11, 12 are at a preferably right angle in space to one another. As a result, they can be moved past one another without colliding with one another. They can also both work simultaneously on the same workplace. The workpiece receptacles can be positioned independently of one another about a preferably common pivot axis S, but this is not compulsory. The workpieces can also be rotated about an axis V that is perpendicular to the pivot axis. This disposition enables flexible machining of the workpieces from arbitrary directions in space. Because in principle each machining unit 13, 14 can machine every side of the workpiece of each workpiece receptacle 8, 9, the two machining units 13, 14 can be utilized equally. This minimizes idle times and time losses.

In FIG. 7, a machine tool 100 is shown, which corresponds essentially to the machine tool 1 shown in FIG. 1. It has a work chamber 103 enclosed by a housing 102. This work chamber is separated from its surroundings. Control elements 104 that are required are disposed outside the work chamber 103. The housing 102 can be opened on its front side over at least half but preferably the entire width by means of two swiveling or sliding doors 105, 106. Two workpiece receptacles 108, 109 and work spindles 111, 112 are disposed in the work chamber 103. The work spindles 111, 112 belong to machining units 113, 114, which include corresponding drive devices for the work spindles 111, 112. The workpiece receptacle 108 has a U-shaped carrier 116, whose cross piece 117, between two legs 119 extending away from the cross piece 117, carries two workpiece receptacle devices 121a, 121b on its side toward the inside of the carrier 116. Both workpiece receptacle devices 121a, 121b are provided with respective chucking means for detachably retaining workpieces 122a, 122b. The workpiece receptacle devices 121a, 121b are disposed laterally side by side in a line that extends parallel to the crosspiece 117 and intersects the two legs 118, 119.

Each of the workpiece receptacle devices 121a, 121b is provided with a rotary positioning device 123a, 123b, by way of which the respective workpiece 122a, 122b is rotatable either infinitely graduated form or in stages about an adjusting axis Va, Vb, which is perpendicular to the crosspiece 117. The rotation about the adjusting axis Va or the adjusting axis Vb is represented by arrows Pv in FIG. 2. The workpieces 122a, 122b can be fixed in set rotary positions.

The legs 118, 119, are supported on their respective free ends pivotably about a pivot axis S on a machine frame 124. For pivotable retention of the carrier 16, the machine frame has two parallel, vertically upward-extending columns 126, 127. At least in or on the column 126, there is a positioning unit 128, which enables pivoting of the carrier 116 by at least 90° and preferably 180° or more. The positioning device 128 is also embodied such that it can define both fixedly predetermined and preferably arbitrary intermediate positions. To that end, the positioning unit 128 can be provided with an NC axis or can be coupled to a serration, which defines discrete, close-together positions.

With respect to an imaginary vertical center plane between the workpiece receptacle 108 and the workpiece receptacle 109, the workpiece receptacle 109 is embodied mirror-symmetrically to the workpiece receptacle 108 and otherwise matches it. The description therefore applies accordingly, except that to distinguish them the reference numerals of the individual parts of the workpiece receptacle 109 are provided with a prime.

The machining units 113, 114 are not permanently assigned to either the workpiece receptacle 108 or the workpiece receptacle 109. Instead, they can be moved laterally such that they can be brought into work engagement with both the workpieces 122a, 122b of the workpiece receptacle 108 and the workpieces 122a', 122b' of the workpiece receptacle 109. This is accomplished by a guiding and adjusting device 130, to allow a targeted lateral adjustment of the work spindle 111 in three directions in space X, Y, Z at right angles to one another. The space direction X coincides with the pivot axis S. The space direction Z preferably coincides with the axis of rotation of the work spindle 111.

To that end, the machining unit 113 is guided via a linear guide 131 that belongs to the adjusting device 130 and has guide rails 132, 133. The linear guide 131 is actuated in the X direction by an NC axis. A corresponding linear guide 134 an NC axis serve to adjust the machining unit 113 in the Y direction. The adjustment travel in the X direction spans both workpiece receptacles 108, 109, while the adjustment travel in the Y or Z direction is markedly shorter.

The Z direction is also actuated via an NC axis 135 and serves as the positioning direction. The work spindle 111 is embodied on its side toward the workpiece 122a, 122b as a crown type turret head, which has a revolver head 140. The revolver head 140 has a total of ten pairs of spindles 141 through 150a, to each of which two spindles 141a, 141b through 150a, 150b belong. All the spindles 141a through 150b are driven from the work spindle 111. The same is correspondingly true for the spindles 141a' through 150b', which are driven from the work spindle 112. The spacings between two work spindles 141a, 141b through 150a, 150b belonging to a spindle pair 141 through 150 all match the spacing between the adjusting axes Va, Vb of the workpiece receptacle 108 and 109, respectively. Optionally, adjusting means may be provided on the workpiece receptacle 108, 109 for its fine adjustment. The spindles 141a, 141b through 145a, 145b are disposed parallel to an imaginary center line, which defines the primary direction of the spindle pair 141 through 145, and in the work position of the applicable spindles 141a, 141b through 150b, 150b is oriented in each case parallel to the adjusting axis Va, Vb. The center lines are located on an imaginary cone with a relatively large opening angle. The other spindle pairs 146 through 50 have center lines which are disposed on the jacket of a cone with a smaller opening. Thus in the circumferential direction of the revolver head 140, the spindle pairs 141 through 150 are each disposed in alternation on the inner or the outer cone. This construction principle can also be employed for revolver heads that have single spindles or four spindles instead of the spindle pairs.

Tools are disposed on the spindles 141a through 150b, and the same tools are disposed at each two spindles belonging to a particular spindle pair 141 through 150.

The revolver heads 140, 140' are structurally identical to one another, and so the description applies accordingly. Merely to distinguish them, the reference numerals for the revolver head 140' are provided with a prime.

The mode of operation of the machine tool 100 described thus far is as follows:

It is assumed that the machining units 113, 114 and the workpiece receptacles 108, 109 of the machine tool 100 initially assume the position shown in FIG. 1. Both machining units 113, 114 address workpieces disposed in the workpiece receptacle 108. The workpiece receptacle 109 is accessible. The door 106 can be opened, and the workpieces 122a', 122b' can be changed. To that end, the carrier 116' of the workpiece receptacle 109 is in the horizontal position; that is, its legs 118', 119' are horizontal. For changing workpieces, the workpiece carrier 116' can also be vertical.

The workpiece carrier 116 is located in a pivoted position suitable for machining of its workpieces 122a, 122b. This can for instance be the horizontal position shown in FIG. 1. Both machining units 113, 114 can be active. As soon as the change of workpieces at the workpiece receptacle 108 has been completed, then as FIG. 2 shows one of the machining units, in the present case the machining unit 114, can be moved to the workpiece receptacle 109. The machining of the workpieces 122a', 122b' can now be done at the appropriate angle with the desired tools. If needed, the machining unit 113 can be moved to the workpiece receptacle 109 as well, so that only this machining unit, or both machining units 113, 114 work at the workpiece receptacle 109. In this case, the workpiece may be changed in receptacle 108. Rotating the workpieces about the adjusting axis Va, Vb and by pivoting about the pivot axis S makes it possible to bring the workpieces 122a, 122b; 122a', 122b' to their required machining positions, and genuine five-sided machining is possible with each machining station. The machining of the workpieces 122a, 122b; 122a', 122b' is effected in synchronized fashion by the spindles of the spindle pairs 141 through 150, so that in the indexing time for one workpiece, two workpieces at a time are completed.

The change of whichever tool is active is done by rotating the revolver head 140, 140', putting the particular desired spindle pair in the active position, in which the axes of rotation are aligned with the X or Y axis, that is, the axes of the work spindles 111, 112. The rotation of the revolver head is effected with the work spindle 111, 112 running, or in other words with the spindles 141a through 150b in motion.

What is claimed is:

1. A machine tool (1), in particular for metal-cutting machining of workpieces (22, 22'), comprising:

at least two devices (8, 9) for receiving workpieces, which devices each have at least one carrier (16, 16', 116, 116'), which is pivotable about a pivot axis (S) and which is provided with a workpiece receptacle device (21, 21');

wherein each carrier (16, 16', 116, 116') is assigned a positioning unit (23, 23'), by means of which the carrier (16, 16') is pivotable about the pivot axis (S) to different positions and is fixable in a respective position;

at least one first machining unit (13), which has at least one first work spindle (11), which can be driven to rotate about an axis of rotation;

a first guiding and adjusting device (30), by means of which the work spindle (11) is adjustable at least in a positioning direction (Z) that coincides with the axis of rotation and in a lateral direction (X) oriented parallel to the pivot axis (S);

wherein the adjustment travel of the first guiding and adjusting device (30) in the lateral direction (X) parallel to the pivot axis (S) is dimensioned to be long enough that a tool, secured to said at least one first work spindle, can be brought selectively into engagement with the workpieces (22, 22') of the two workpiece receptacles (8, 9); and wherein the workpiece receptacle device (21, 21', 121a, 121b) includes a rotary positioning device (23, 23'), by means of which the workpiece (22, 22') can be adjusted purposefully about an adjusting axis (V), which is oriented perpendicular to the pivot axis (S) and intersects the pivot axis (S).

2. A machine tool (1), in particular for metal-cutting machining of workpieces (22, 22'), comprising:

at least two devices (8, 9) for receiving workpieces, which devices each have at least one carrier (16, 16', 116, 116'), which is pivotable about a pivot axis (S) and which is provided with a workpiece receptacle device (21, 21');

wherein each carrier (16, 16', 116, 116') is assigned a positioning unit (23, 23'), by means of which the carrier (16, 16') is pivotable about the pivot axis (S) to different positions and is fixable in a respective position;

at least one first machining unit (13), which has at least one first work spindle (11), which can be driven to rotate about an axis of rotation;

a first guiding and adjusting device (30), by means of which the work spindle (11) is adjustable at least in a positioning direction (Z) that coincides with the axis of rotation and in a lateral direction (X) oriented parallel to the pivot axis (S);

wherein the adjustment travel of the first guiding and adjusting device (30) in the lateral direction (X) parallel to the pivot axis (S) is dimensioned to be long enough that a tool, secured to said at least one first work spindle, can be brought selectively into engagement with the workpieces (22, 22') of the two workpiece receptacles (8, 9);

wherein each carrier 116, 116' has two workpiece receptacle devices (121a, 121b); and wherein said at least one first work spindle in the first machining unit comprises at least one pair of spindles (141).

3. The machine tool of claim 2, characterized in that the adjustment travel (X) of the first guiding and adjusting device (30) is oriented perpendicular to the positioning direction (Z), and that the first work spindle (11) is adjustable by means of the first guiding and adjusting device (30) in an additional adjusting direction (Y), which is oriented perpendicular to both the lateral direction (X) and the positioning direction (Z).

4. The machine tool of claim 2, further comprising:
at least one second machining unit (14), which has at least one second work spindle (12) which can be driven to rotate about an axis of rotation;
a second guiding and adjusting device (30'), by means of which the work spindle (12) is adjustable at least in a positioning direction (Y) that coincides with the axis of rotation and in a lateral direction (X) oriented parallel to the pivot axis (S);
wherein the adjustment travel of the second guiding and adjusting device (30') in the lateral direction (X) parallel to the pivot axis (S) is dimensioned to be long enough that a tool, secured to said at least one second work spindle, can be brought selectively into engagement with both workpieces (22, 22') of the two workpiece receptacles (8, 9);
wherein the adjustment travel (X) of the second guiding and adjusting device (30') is oriented perpendicular to the positioning direction (Y), and the second work spindle (12) is adjustable by means of the second guiding and adjusting device (30') in an additional adjusting direction (Z), which is oriented perpendicular to both the lateral direction (X) and the positioning direction (Y).

5. The machine tool of claim 4, characterized in that each of said first and second work spindles (11, 12) is provided with a respective revolver (40, 40'), which has a plurality of driven spindles (41, 42, 43, 44, 45, 46; 41', 42', 43', 44', 45', 46), which each carry separate tools, and respective axes of rotation of said first and second work spindles (11, 12) are oriented in different directions perpendicular to one another.

6. A machine tool (1), in particular for metal cutting machining of workpieces (22, 22'), comprising:
at least two devices (8, 9) for receiving workpieces, which devices each have at least one carrier (16, 16', 116, 116'), which is pivotable about a pivot axis (S) and which is provided with a workpiece receptacle device (21, 21');
wherein each carrier (16, 16', 116, 116') is assigned a positioning unit (23, 23'), by means of which the carrier (16, 16') is pivotable about the pivot axis (S) to different positions and is fixable in a respective position;
at least one first machining unit (13), which has at least one first work spindle (11), which can be driven to rotate about an axis of rotation;
a first guiding and adjusting device (30), by means of which the work spindle (11) is adjustable at least in a positioning direction (Z) that coincides with the axis of rotation and in a lateral direction (X) oriented parallel to the pivot axis (S);
wherein the adjustment travel of the first guiding and adjusting device (30) in the lateral direction (X) parallel to the pivot axis (S) is dimensioned to be long enough that a tool, secured to said at least one first spindle, can be brought selectively into engagement with the workpieces (22, 22') of the two workpiece receptacles (8, 9); and
wherein the carriers (16, 16') of the workpiece receptacle (8, 9) are embodied in the shape of a U and are disposed side by side and have two legs (18, 19; 18', 19') joined together at ends thereof via respective crosspieces (17, 17'), on which the workpiece receptacle device (21, 21') is disposed; and that the ends of the legs (18, 19; 18', 19') remote from the crosspiece (17, 17') are connected to a positioning unit (28, 28') that defines the pivot axis (S), and the pivot axes (S) of the two carriers (16, 16') coincide.

7. The machine tool of claim 1, characterized in that the rotary positioning devices (123a, 123b) are actuatable synchronously with one another.

8. The machine tool of claim 7, characterized in that the rotary positioning devices (123a, 123b) have a common drive mechanism.

9. The machine tool of claim 2, characterized in that the rotary positioning devices (123a, 123b) are actuatable synchronously with one another.

10. The machine tool of claim 9, characterized in that the rotary positioning devices (123a, 123b) have a common drive mechanism.

11. The machine tool of claim 2, characterized in that spindles (141a through 150b) of each said spindle pair (141 through 150) are driven in synchronized fashion, and the spindles (141a, 141b; 141'a, 141'b) of each said spindle pair (141, 141') have a common drive source (111, 112).

12. The machine tool of claim 2, characterized in that said at least one pair of spindles in the first machining unit comprises a plurality of spindles (141a, 141b; 141a', 141b') that are provided in pairs, each pair on one revolver (140, 140') which has a plurality of driven spindles (141a through 150b; 141a' through 150b'), which each carry separate tools, wherein spindles (141a, 150b) of the spindle pairs (141) through (150) are each disposed parallel to a center line which is located centrally between them and on a jacket of an imaginary cone.

13. The machine tool of claim 12, characterized in that the spindles (141a through 150b) of the spindle pairs (141 through 150) are each disposed parallel to a center line located centrally between them, which line is located in alternation on the jacket of an imaginary cone having a larger opening angle and of an imaginary cone having a smaller opening angle.

14. The machine tool of claim 6, further comprising:
at least one second machining unit (14), which has at least one second work spindle (12) which can be driven to rotate about an axis of rotation;
a second guiding and adjusting device (30'), by means of which the work spindle (12) is adjustable at least in a positioning direction (Y) that coincides with the axis of rotation and in a lateral direction (X) oriented parallel to the pivot axis (S);
wherein the adjustment travel of the second guiding and adjusting device (30') in the lateral direction (X) parallel to the pivot axis (S) is dimensioned to be long enough that a tool, secured to said at least one second work spindle, can be brought selectively into engagement with both workpieces (22, 22') of the two workpiece receptacles (8, 9);
wherein the adjustment travel (X) of the second guiding and adjusting device (30') is oriented perpendicular to the positioning direction (Y), and the second work spindle (12) is adjustable by means of the second guiding and adjusting device (30') in an additional adjusting direction (Z), which is oriented perpendicular to both the lateral direction (X) and the positioning direction (Y).

15. The machine tool of claim 6, characterized in that said at least one pair of spindles in the first machining unit comprises a plurality of spindles (141a, 141b; 141a', 141b')

that are provided in pairs, each pair on one revolver (140, 140') which has a plurality of driven spindles (141a through 150b; 141a' through 150b'), which each carry separate tools, wherein spindles (141a, 150b) of the spindle pairs (141) through (150) are each disposed parallel to a center line which is located centrally between them and on a jacket of an imaginary cone.

16. The machine tool of claim 6, characterized in that the adjustment travel (X) of the first guiding and adjusting device (30) is oriented perpendicular to the positioning direction (Z), and that the first work spindle (11) is adjustable by means of the first guiding and adjusting device (30) in an additional adjusting direction (Y), which is oriented perpendicular to both the lateral direction (X) and the positioning direction (Z).

17. The machine tool of claim 6, further comprising:
   at least one second machining unit (14), which has at least one second work spindle (12) which can be driven to rotate about an axis of rotation;
   a second guiding and adjusting device (30'), by means of which the work spindle (12) is adjustable at least in a positioning direction (Y) that coincides with the axis of rotation and in a lateral direction (X) oriented parallel to the pivot axis (S);
   wherein the adjustment travel of the second guiding and adjusting device (30') in the lateral direction (X) parallel to the pivot axis (S) is dimensioned to be long enough that a tool, secured to said at least one second work spindle, can be brought selectively into engagement with both workpieces (22, 22') of the two workpiece receptacles (8, 9);
   wherein the adjustment travel (X) of the second guiding and adjusting device (30') is oriented perpendicular to the positioning direction (Y), and the second work spindle (12) is adjustable by means of the second guiding and adjusting device (30') in an additional adjusting direction (Z), which is oriented perpendicular to both the lateral direction (X) and the positioning direction (Y).

18. The machine tool of claim 6, characterized in that each of said first and second work spindles (11, 12) is provided with a respective revolver (40, 40'), which has a plurality of driven spindles (41, 42, 43, 44, 45, 46; 41', 42', 43', 44', 45', 46), which each carry separate tools, and respective axes of rotation of said first and second work spindles (11, 12) are oriented in different directions perpendicular to one another.

19. The machine tool of claim 6, characterized in that the rotary positioning devices (123a, 123b) are actuatable synchronously with one another.

20. The machine tool of claim 19, characterized in that the rotary positioning devices (123a, 123b) have a common drive mechanism.

21. The machine tool of claim 6, characterized in that spindles (141a through 150b) of each said spindle pair (141 through 150) are driven in synchronized fashion, and the spindles (141a, 141b; 141'a, 141'b) of each said spindle pair (141, 141') preferably have a common drive source (111, 112).

22. The machine tool of claim 6, characterized in that said at least one pair of spindles comprises a plurality of spindles in the first machining unit (141a, 141b; 141a', 141b') that are provided in pairs, each pair on one revolver (140, 140') which has a plurality of driven spindles (141a through 150b; 141a' through 150b'), which each carry separate tools, wherein spindles (141a, 150b) of the spindle pairs (141) through (150) are each disposed parallel to a center line which is located centrally between them and on a jacket of an imaginary cone.

23. The machine tool of claim 22, characterized in that the spindles (141a through 150b) of the spindle pairs (141 through 150) are each disposed parallel to a center line located centrally between them, which line is located in alternation on the jacket of an imaginary cone having a larger opening angle and of an imaginary cone having a smaller opening angle.

24. The machine tool of claim 1, characterized in that the adjustment travel (X) of the first guiding and adjusting device (30) is oriented perpendicular to the positioning direction (Z), and that the first work spindle (11) is adjustable by means of the first guiding and adjusting device (30) in an additional adjusting direction (Y), which is oriented perpendicular to both the lateral direction (X) and the positioning direction (Z).

25. The machine tool of claim 1, further comprising:
   at least one second machining unit (14), which has at least one second work spindle (12) which can be driven to rotate about an axis of rotation;
   a second guiding and adjusting device (30'), by mean s of which the work spindle (12) is adjustable at least in a positioning direction (Y) that coincides with the axis of rotation and in a lateral direction (X) oriented parallel to the pivot axis (S);
   wherein the adjustment travel of the second guiding and adjusting device (30') in the lateral direction (X) parallel to the pivot axis (S) is dimensioned to be long enough that a tool, secured to said at least one second work spindle, can be brought selectively into engagement with both workpieces (22, 22') of the two workpiece receptacles (8, 9);
   wherein the adjustment travel (X) of the second guiding and adjusting device (30') is oriented perpendicular to the positioning direction (Y), and the second work spindle (12) is adjustable by means of the second guiding and adjusting device (30') in an additional adjusting direction (Z), which is oriented perpendicular to both the lateral direction (X) and the positioning direction (Y).

26. The machine tool of claim 25, characterized in that each of said first and second work spindles (11, 12) is provided with a respective revolver (40, 40'), which has a plurality of driven spindles (41, 42, 43, 44, 45, 46; 41', 42', 43', 44', 45', 46), which each carry separate tools, and respective axes of rotation of said first and second work spindles (11, 12) are oriented in different directions perpendicular to one another.

27. The machine tool of claim 1, characterized in that spindles (141a through 150b) of each said spindle pair (141 through 150) are driven in synchronized fashion, and the spindles (141a, 141b; 141'a, 141'b) of each said spindle pair (141, 141') preferably have a common drive source (111, 112).

28. The machine tool of claim 15, characterized in that spindles (141a through 150b) of said spindle pairs (141 through 150) are each disposed parallel to a center line located centrally between them, which line is located in alternation on the jacket of an imaginary cone having a larger opening angle and of an imaginary cone having a smaller opening angle.

* * * * *